(12) United States Patent
Amend et al.

(10) Patent No.: US 11,838,869 B2
(45) Date of Patent: Dec. 5, 2023

(54) ENERGY SAVING TECHNIQUES FOR MULTI-CONNECTIVITY DEVICES

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/773,851

(22) PCT Filed: Nov. 3, 2020

(86) PCT No.: PCT/EP2020/080773
§ 371 (c)(1),
(2) Date: May 3, 2022

(87) PCT Pub. No.: WO2021/089520
PCT Pub. Date: May 14, 2021

(65) Prior Publication Data
US 2022/0377673 A1  Nov. 24, 2022

(30) Foreign Application Priority Data

Nov. 4, 2019 (EP) .................................... 19206926

(51) Int. Cl.
*H04W 52/02* (2009.01)
(52) U.S. Cl.
CPC .............................. *H04W 52/0277* (2013.01)

(58) Field of Classification Search
CPC ......... H04W 52/0277; H04W 28/0917; H04W 52/0212; H04W 76/15; H04L 69/14; Y02D 30/50; Y02D 30/70
USPC .......................... 370/331; 455/418–420, 574
See application file for complete search history.

(56) References Cited

U.S. PATENT DOCUMENTS

| 6,226,527 | B1 | 5/2001 | Dalsgaard et al. |
| 10,104,643 | B2 | 10/2018 | Tsai et al. |
| 10,366,556 | B1 * | 7/2019 | Mondrow .......... G07C 9/00309 |

(Continued)

FOREIGN PATENT DOCUMENTS

| CN | 106105379 A | 11/2016 |
| CN | 106131300 A | 11/2016 |

(Continued)

*Primary Examiner* — Michael Y Mapa
(74) *Attorney, Agent, or Firm* — LEYDIG, VOIT & MAYER, LTD.

(57) ABSTRACT

A method for reducing the energy consumption of a mobile device includes: measuring condition values of the mobile device by a measuring unit associated to the mobile device; comparing the measured condition values of the mobile device to entries of a condition listing, wherein the condition listing is stored in a memory unit of the mobile device; and initiating an energy saving program of the mobile device upon detecting a match of the measured condition values and an entry of the condition listing. The entries of the condition listing comprise the following measuring condition values of the mobile device: a display state, an activity state, a traffic consumption value, a traffic stream value, an SSID state, a BSSID state, an ESSID state, authentication information, and/or access type information.

20 Claims, 3 Drawing Sheets

(56) References Cited

U.S. PATENT DOCUMENTS

| | | | |
|---|---|---|---|
| 2006/0030374 A1* | 2/2006 | Ranta | G06F 3/038 |
| | | | 455/343.1 |
| 2009/0258649 A1 | 10/2009 | Salowey | |
| 2010/0304794 A1* | 12/2010 | Beninghaus | H04W 52/0274 |
| | | | 455/574 |
| 2012/0003976 A1 | 1/2012 | Bhat et al. | |
| 2012/0135696 A1* | 5/2012 | Lerzer | H04W 52/0296 |
| | | | 455/127.1 |
| 2012/0309445 A1* | 12/2012 | Tsui | H04B 17/26 |
| | | | 455/522 |
| 2012/0324259 A1* | 12/2012 | Aasheim | H04W 52/0258 |
| | | | 713/340 |
| 2014/0089704 A1* | 3/2014 | de Santiago Domnguez | |
| | | | G06F 1/3284 |
| | | | 713/323 |
| 2014/0187242 A1* | 7/2014 | Zhang | H04W 8/20 |
| | | | 455/435.2 |
| 2015/0326037 A1* | 11/2015 | Borhan | H01M 10/44 |
| | | | 320/162 |
| 2016/0098339 A1* | 4/2016 | Masilamani | G06F 1/3212 |
| | | | 702/186 |
| 2016/0135144 A1 | 5/2016 | Tsai et al. | |
| 2017/0118715 A1* | 4/2017 | Bhattacharya | H04W 52/0277 |
| 2017/0208544 A1* | 7/2017 | Hunt-Schroeder | |
| | | | H04W 52/028 |
| 2022/0053426 A1* | 2/2022 | Ahn | H04W 52/0277 |

FOREIGN PATENT DOCUMENTS

| | | |
|---|---|---|
| CN | 106304205 A | 1/2017 |
| WO | WO 2018226047 A1 | 12/2018 |

* cited by examiner

ENERGY SAVING TECHNIQUES FOR MULTI-CONNECTIVITY DEVICES

CROSS-REFERENCE TO PRIOR APPLICATIONS

This application is a U.S. National Phase application under 35 U.S.C. § 371 of International Application No. PCT/EP2020/080773, filed on Nov. 3, 2020, and claims benefit to European Patent Application No. EP 19206926.8, filed on Nov. 4, 2019. The International Application was published in English on May 14, 2021 as WO 2021/089520 A1 under PCT Article 21(2).

FIELD

The present disclosure relates to energy saving techniques for multi-connectivity devices, in particular smart phones or smart watches, which are enabled to use Hybrid Access techniques. The disclosure further relates to methods, devices, and a computer product for energy saving techniques in a Hybrid Access environment.

BACKGROUND

Hybrid Access (HA) combines at least two different network links with the same or different network technology; for example, it combines access over a fixed network with access over a cellular network.

A typical HA client has at least two access interfaces, one access interface for example for Digital Subscriber Line (DSL) access and another one for access to a Long Term Evolution (LTE) network. Algorithms implemented on a processor of the Hybrid Access client are focused on a distributed client-server solution with client functionality in the residential gateway and server functionality (HA Server) in a data center at the network of an operator or in the public Internet. The Multipath Transmission Control Protocol (MPTCP) according to RFC 6824: "A. Ford, C. Raiciu, M. Handley, and O. Bonaventure, "TCP Extensions for Multipath Operation with Multiple Addresses," RFC, no. 6824, January 2013" can be applied for HA. MPTCP is a new proposed standard for a transport layer protocol as an extension to the regular Transmission Control Protocol (TCP). In the MPTCP technique typically two endpoints are connected by the MPTCP technique and network performance can be enhanced by using multiple interfaces to maximize the overall data throughput, enhancing reliability, and capacity aggregation across several paths. Another multipath protocol offering these benefits are Multipath QUIC according to Quentin De Coninck and Olivier Bonaventure, "Multipath Extensions for QUIC (MP-QUIC)", draft-deconinck-quic-multipath-03, August 2019 or "N. Leymann and C. Heidemann and M. Zhang and B. Sarikaya and M. Cullen, 'Huawei's GRE Tunnel Bonding Protocol', RFC no. 8157, May 2017".

Basic network architectures providing multi-connectivity are available as Hybrid Access "Nicolai Leymann and Cornelius Heidemann and Margaret Wasserman and Li Xue and Mingui Zhang, 'Hybrid Access Network Architecture', draft-lhwxz-hybrid-access-network-architecture-02, January 2015" or "BBR Specification TR-348, July 2016" and 3GPP ATSSS "3GPP Specification: 23.793, Version 16.0.0, 29 Dec. 2018".

However, operating several communication interfaces simultaneously in a customer equipment means additional power consumption. In particular, mobile devices, like smartphones and or smart watches with Wi-Fi and cellular interfaces, are very power sensitive when using several communication interfaces since their energy capacity is limited due to the built in battery.

For this reason, today's mobile devices usually only operate one communication interface at a time, even if the device is equipped with more than one communication interface. However, that interferes with the multi-connectivity approach in a hybrid access environment, which requires more than one communication interface to be switched on in order to transmit traffic data over multiple communication paths.

Multi-connectivity techniques provide a more reliable and powerful connectivity, in particular for smart-phone users or in residential scenarios by a Hybrid Access CPE (Customer-premises equipment). However, from an energy perspective this means computation overhead for multi-connectivity calculations (FEC, encryption, scheduling logic, re-assembly, signaling, etc.). Furthermore, it requires at least multiple communication interfaces to be powered.

The article "'MPTCP path selection using CapProbe' by Jorge Mena; Yuanzhi Gao; and Mario Gerla in 2018 IEEE Wireless Communications and Networking Conference (WCNC)" describes a method how to select the network flow with the best performance in a multi-connectivity environment when deactivating one of the network flows due to battery conservation reasons. The work identifies two key metrics that can be used to identify the path with the best technical performance.

SUMMARY

In an exemplary embodiment, the present invention provides a method for reducing the energy consumption of a mobile device having a multi-connectivity functionality that comprises at least two different communication interfaces. Each of the least at least two different communication interfaces is associated to a different network flow. The method includes: measuring condition values of the mobile device by a measuring unit associated to the mobile device; comparing the measured condition values of the mobile device to entries of a condition listing, wherein the condition listing is stored in a memory unit of the mobile device; and initiating an energy saving program of the mobile device upon detecting a match of the measured condition values and an entry of the condition listing. The entries of the condition listing comprise the following measuring condition values of the mobile device: a display state, an activity state, a traffic consumption value, a traffic stream value, an SSID state, a BSSID state, an ESSID state, authentication information, and/or access type information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
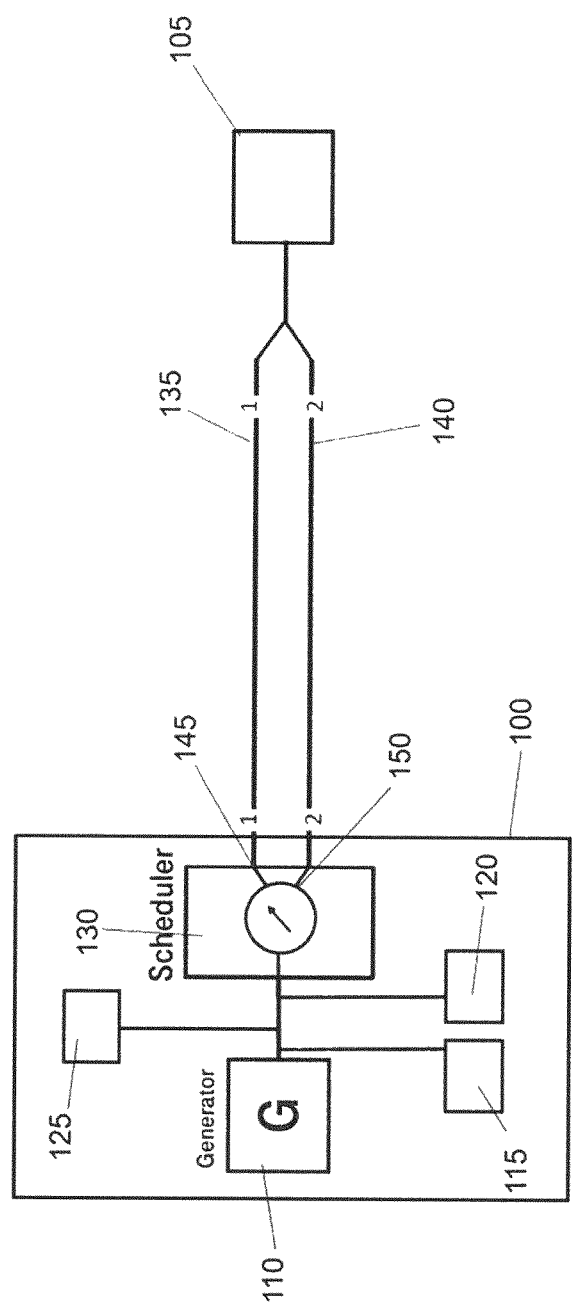
FIG. 1 shows a mobile device according to the invention.

Exemplary embodiments of the invention provide methods, mobile devices and/or a computer program to lower the energy consumption of a mobile device in a Hybrid Access environment.

According to a first aspect, the invention relates to a method for reducing the energy consumption of a mobile device having a multi-connectivity functionality that comprises at least two different communication interfaces, wherein each of the at least two different communication interfaces is associated to a different network flow, the method comprising:

measuring condition values of the mobile device by a measuring unit that is associated to the mobile device;
  comparing the measured condition values of the mobile device to entries of condition listing, wherein the condition listing is being stored in a memory unit of the mobile device; and
  initiating an energy saving program of the mobile device up on detecting a match of the measured condition values and an entry of the condition listing, wherein energy saving program comprises a limitation of the multi-connectivity of the mobile device.

This provides the advantage that a method is provided, which is easy to implement and can efficiently reduce the energy consumption of a mobile device which leads to an enhanced battery life of the mobile device. The method offers a tradeoff between multi-connectivity performance of the mobile device on one hand and lowering the energy consumption on the other hand.

There are some measuring conditions of the mobile device existing where it makes sense in almost all cases to reduce the energy consumption of the mobile device simply because a high-performance status, which normally uses more than one communication interface to transfer data, is not necessary when any of these conditions are detected. These states are made known to the device by storing them in the condition listing, which is stored in a memory unit of the mobile device. Therefore, the mobile device can check independently from other devices if there is a match between the measuring condition values and the entries of the condition listing. In case of such a match, the energy saving program of the mobile device is activated. The condition listing can be updated to include new measuring condition values. Such an update can be installed on the device during regular updates of the operating system.

Basically, those measuring conditions can be pictured by every parameter that describes technical aspects of the mobile device. The measured condition values need to be at least a subset of the entries of the condition listing. The comparison process examines which entry of the condition listing matches to the measured condition values. If a match is found, energy saving program of the mobile device is activated.

In an embodiment, the mobile device asks a user if he wants to activate the energy saving program. This provides the advantage that the user can actively decide if he wants to reduce the energy consumption of the device or if he wants the device to operate in multi-connectivity mode and to transfer the data traffic via multiple network flows. The mobile device can ask the user via an intelligent digital assistant like Siri or by a dedicated user input windows that pop up on the display screen of the mobile device. Especially if the user knows that he will soon be able to charge the mobile device again, he can choose not to activate the energy saving program.

In an embodiment, the method comprises measuring the charge state of the battery of the mobile device with the measuring unit and initiating the energy saving program upon detecting that the charge of the battery is below a predefined threshold. The charge state of the battery can be measured as a measuring condition value of the mobile device. This provides the advantage that the energy saving program is only activated in cases of a critical battery charging state and the user can benefit from a multi-connectivity in all charging states of the battery. For example, the predefined threshold can be set to 25%, or preferred to 10% of a fully charged battery.

In an embodiment, the method comprises measuring the energy consumption of the respective network flows and/or communication interfaces and choosing the network flow and/or communication interface that has the lowest energy consumption while at the same time fulfilling the requirements of a user in terms of data traffic or a data transfer. The requirements of the user are technical requirements, which are associated to an application that is running on the mobile device of the user and can be assessed by a processor of the mobile device. For example, the technical requirements can be a minimum of bandwidth if the user streams a video on his mobile device. For the experience of the user, it is beneficial not to set the mobile device to the lowest possible energy consumption by deactivating multi-connectivity features but only to lower the energy consumption to value that he can still use his applications without disturbance.

An alternative to the method described above is to measure the performance of the respective network flows and to choose the network flow that has the best performance for data transfer. The net flow with the best performance can be assessed for example by the method described in "'MPTCP path selection using CapProbe' by Jorge Mena; Yuanzhi Gao; and Mario Gerla in 2018 IEEE Wireless Communications and Networking Conference (WCNC)". The energy consumption of the mobile device, however, will still be reduced, since only one communication interface and/or one network flow is kept active while the others are deactivated.

In an embodiment, the method comprises measuring if the mobile device is connected to an electrical power supply and to terminate the energy saving program upon detecting that the mobile device is connected to the electrical power supply. This provides the advantage that the energy saving program is terminated or is not activated even if it is detected that the charge state of the battery is below the predefined level. If the mobile device is connected to an electrical power supply it is assumed that its charging state is likely to rise even if all multi-connectivity functions are being activated. Therefore, the energy saving program is not necessary.

In an embodiment, the entries of the condition listing comprises the following measuring condition values of the mobile device: a display state, an activity state, a traffic consumption value, traffic stream value, a SSID state, a BSSID state, a ESSID state, a location information, an authentication information and/or an access type information. This provides the advantage that the energy saving program can be activated upon detecting one of these measuring condition values. Of course, the listing can be changed to include further measuring condition values.

The display state differentiates if the display of a mobile device is in the "Off" or "On" state. In most mobile devices the display state turns automatically from an "On" to the "Off" if the mobile device is not used actively within a predefined time periods. It is very likely that the user does not need full multi-connectivity performance if the display is in the "Off" state Many mobile devices have an activity state. For example, Apple's iPhone features a "Low Power Mode". If the user has activated such a "Low Power Mode" he aims to increase the battery lifetime. Therefore, it is likely that he does not want to use full multi-connectivity performance in those situations.

If the traffic consumption value is very low so that he can be easily be satisfied without using full multi-connectivity performance, the energy saving program should be activated. To provide a basis for the decision if the energy program should be activated, the user/a network provider/the manufacturer can provide certain predefined threshold values for the traffic consumption so that the energy saving program is activated if a traffic consumption value is lower than these thresholds.

Basic service sets (BSSs): An infrastructure mode wireless network basic service set (BSS) consists of one redistribution point—typically an access point (WAP or AP)—together with one or more "client" stations that are associated with (i.e. connected to) that redistribution point. The operating parameters of the infrastructure-BSS are defined by the redistribution point. Stations communicate only with the redistribution point that they are associated with, and all traffic within the infrastructure-BSS is routed through/bridged by that redistribution point.

Service set ID (SSID): The SSID is broadcast by stations in beacon packets to announce the presence of a network.

Extended service sets (ESSs): An extended service set (ESS) is a set of one or more infrastructure basic service sets on a common logical network segment (i.e. same IP subnet and VLAN). The participating basic service sets appear as a single network to the logical link control layer. Thus, from the perspective of the logical link control layer, stations within an ESS may communicate with one another, and mobile stations may move transparently from one participating BSS to another (within the same ESS). Extended service sets make possible distribution services such as centralized authentication and seamless roaming between infrastructure-BSSs. From the perspective of the link layer, all stations within an ESS are all on the same link, and transfer from one BSS to another is transparent to logical link control.

Location environment: The location environment can be assessed by using GPS data of the network entity, in particular of the smartphone. If the local environment yields that the user is in a remote region without energy supply, the energy saving program should be activated so that the user does not have the risk that the mobile device shuts Off due to an empty battery.

Authentication information. Authentication information can be assessed if a guest user uses the mobile device. In order to keep the battery charged level as high as possible for the main user of the mobile device, the energy saving program can be activated if the guest user uses the mobile device.

In an embodiment, an algorithm that can be implemented on a processor of the mobile device analyzes the measuring condition values and generates a dedicated energy saving program with respect to energy saving and/or performance target parameters. This provides the advantage that the energy saving program is not designed in a rigid way—the energy saving program adapts dynamically to certain parameters. If an application is running on the mobile device, such an application can provide certain performance target parameters that need to be fulfilled in order that the application can run smoothly. In such case the energy saving program can be generated by the algorithm accordingly. Another option is that the user can define regarding the energy saving program to which degree the performance of the mobile device should be lowered or how long the battery charge should last. If the user knows that he has access to energy supply within the next hour, he can specify that the battery does not need to last longer than one hour. In such a case, the energy saving program does not lower the multi-connectivity performance as much as in the case when the user will not have access to the energy supply within the next two hours, for example.

The access type information, which can be assessed as the measuring condition values, provide a useful decision-making basis for the algorithm to decide which communication interface and/or network flow can be deactivated when starting the energy saving program. The access type technology yields information about the individual performance of the individual network flows, which are associated to each access type, respectively. The access type technology is differentiated for mobile interfaces, cellular interfaces, fixed interfaces and Wi-Fi interfaces, which might be the case in smartphones, CPEs (Customer Premises Equipment) or other devices.

The mobile access technology can be further differentiated by the following cellular mobile communication standards: 2G, 3G, 4G, 5G and can be further extended. The Wi-Fi access technology can be further differentiated by the following Wi-Fi standards: Wi-Fi 1, 2, 3, 4, 5, 6 and can be further extended. The fixed access can be further separated by copper and FTTH technology and the individual speeds negotiated. For example, if the measured condition values yield that the first network flow is the mobile communication standards: 2G and the Wi-Fi standard is Wi-Fi 6 the algorithm decides to deactivate the 2G network flow and the associated communication interface because the 2G network flow has a lower network performance than the Wi-Fi 6. On the other hand, if the measured condition values yield that the first network flow is the mobile communication standards: 5G and the Wi-Fi standard is Wi-Fi 1 the algorithm decides to deactivate the Wi-Fi 1 network flow and the associated communication interface because the Wi-Fi 1 network flow has a lower network performance than the Wi-Fi 6.

In an embodiment, the algorithm takes a usage history of the mobile device into account. The usage history has information about times in which the user uses his mobile device actively and about times in which the user usually does not use his mobile device actively and about times the user usually charges his mobile device. This provides the advantage that the energy saving program can be activated at times in which it is very likely that the user does not want to use his mobile device actively. For example, the user usually does not use his mobile device actively during his sleeping times. Starting the energy saving program during the sleeping times of the user lowers the energy consumption of the mobile device without affecting the quality of usage experience of the user.

In an embodiment, the energy saving program comprises the following energy saving measures: switching off multi-connectivity means, disabling or reducing a particular network interface, disabling an activation of a particular network interface and/or disabling multi-connectivity status messages.

Switching off multi-connectivity means may include disabling certain multi-connectivity network protocols and/or deactivating traffic distribution components. Possible ways to disable/reduce particular communication interface (for example a cellular communication interface) are to power "Off" the whole communication interface, to activate special low-power modes, to deactivate the data path/network flow and/or to deactivate certain functionalities, for example frequencies, bandwidth and/or rates. The measure "disabling an activation of a particular network interface" basically means that the maximum number of active communication interfaces at a time is limited to a predefined value. The measure "disabling multi-connectivity status messages" basically means that messages or signals that are not required for full multi-connectivity performance are disabled. Especially those status messages and signals which are associated with disabled and non-activated communication interfaces do not need to be generated and transmitted and can therefore be disabled.

This provides the advantage that the energy consumption of the mobile device can be efficiently reduced by executing the individual energy saving techniques or a combination of those energy saving techniques. Which energy saving techniques are selected is appropriately chosen by the algorithm, which is executed by the processor of the mobile device. The more the energy consumption needs to be lowered, the more of these energy saving techniques can be combined.

In an embodiment, the algorithm selects the energy saving measure with the best performance if multiple energy saving measures meet the energy saving and/or performance target parameters.

This provides the advantage that the energy consumption of the mobile device is efficiently reduced while at the same time providing the best network performance of the mobile device. This keeps the trade-off between low energy consumption while exploiting multi-connectivity when it is really needed.

According to a second aspect, the invention relates to a mobile device configured for reducing the energy consumption according to the method described above, the mobile device comprising:
- at least two different communication interfaces, wherein each of the communication interfaces is assigned to a different network flow, wherein each of the communication interfaces is configured to enable data traffic for the mobile device;
- a measuring unit configured to measure the conditions values of the mobile device;
- a memory unit configured to store a condition listing and the measurement condition values, wherein the condition listing lists possible condition values of the mobile device and the measurement condition values lists actual measured condition values of the mobile device;
- a processor configured to compare the measurement condition values to the entries of the condition listing wherein the processor is configured to generate and to execute an energy saving program of the mobile device, wherein energy saving program comprises a limitation of the multi-connectivity of the mobile device.

This provides the advantage that the mobile device can independently execute an energy saving program to reduce its energy consumption and to prolong the lifetime of its battery. The term lifetime of a battery basically means the time until the battery needs to be charged again. In other words within the context of this invention lifetime of battery is the time until the battery is empty and out of energy.

Possible mobile devices are smart-phones, tablets, smart-watches or other entities running on a battery with limited energy capacity.

In an embodiment, the measuring unit is configured to measure a charge state of battery of the mobile device. This provides the advantage that the processor can decide on basis of the charge the state of the battery if it is necessary to execute the energy saving program.

According to a third aspect, the invention relates to a computer program comprising instructions, which when the program is executed by the mobile device, cause the mobile device to carry out the steps of the method described above. Such a computer program can be installed on dedicated mobile devices and enables those mobile devices to efficiently execute energy saving programs to reduce the energy consumption of the mobile device.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a mobile device 100 that is connected to a network entity 105 via the internet. The mobile device 100 comprises a generator 110 that is configured to generate data traffic, a processor 115 configured to perform calculations and to execute algorithms, and a memory unit 120 to which the processor 115 has access and which is configured to store a the condition listing that lists measured condition values of the mobile device 100.

The mobile device 100 further comprises an internal measuring unit 125 and a scheduler 130 that is configured to schedule the generated data stream in two different network flows 135, 140 by using communication interfaces 145, 150. The communication interfaces 145, 150 are also used to receive data from the internet. Within the meaning of FIG. 1, there is a mobile network flow 135, which is associated to a mobile communication interface 145 and a Wi-Fi network flow 140, which is associated to the Wi-Fi communication interface 150.

The internal measuring unit 125 detects the measured condition values that can be stored in the memory unit 120. The internal measuring unit 125 has access to properties of the mobile device 100 like if its screen is turned "On" or "Off", an activity state of the mobile device, a traffic consumption value, a traffic stream value, a SSID state, a BSSID state, an ESSID state, a location information, an authentication information and/or an access type information. Of course, many more properties of the mobile device 100 can be measured.

Figure 2:
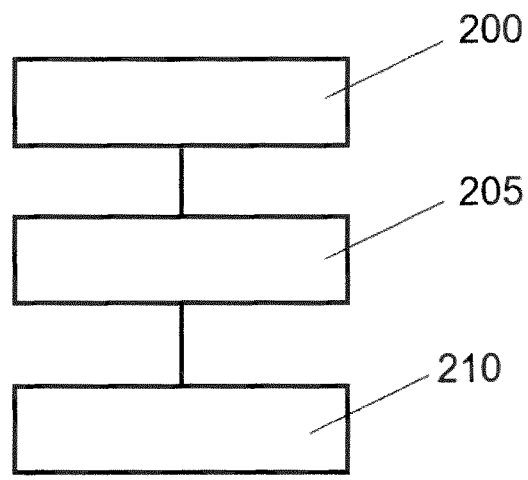
FIG. 2 shows a schematic plan of a method according to the invention.

FIG. 2 shows a schematic plan that illustrates how the mobile device 100 reduces its energy consumption.

In step 200 condition values of the mobile device 100 are measured by the measuring unit 125 associated to the mobile device 100. In other words, in step 200 the mobile device 100 determines with its measuring unit 125 its state and its technical performance requirements. The technical performance requirements can be a required bandwidth or other parameters, which are typically determined by applications running on the mobile device 100.

In step 205, the measured condition values of the mobile device are compared to entries of a condition listing, wherein the condition listing is being stored in a memory unit 120 of the mobile device 100. The entries of the condition listing are in principle the same parameters as the measured condition values. Due to that fact is possible to detect a match of the measured condition values and one of the entries of the condition listing.

For example, the measuring unit 125 detects that
the display of the mobile device 100 is in the "Off" state,
the charge state of the battery is below a predefined level,
no user application is running on the mobile device 100, and
the mobile device 100 is connected to the Internet via the mobile network flow 135 and the Wi-Fi network flow 140.

An algorithm that is implemented on the processor 115 of the mobile device 100 finds a match of this measured condition value in the condition listing. Typically, the display "Off" state is a situation in which the user of the mobile device 100 does not use the mobile device 100 actively so that it makes sense to reduce the energy consumption of the mobile device 100.

Hence, in step 210 and energy saving program is initiated on the mobile device 100 detecting a match of the measured condition values and the entry of the condition listing.

The algorithm generates an energy saving program that is tailored to the specific requirements of the mobile device 100 at a specific point in time. In the above exemplary case, the algorithm generates an energy saving plan which orders the processor to deactivate the mobile communication interface 145 that leads to the deactivation of the mobile network flow 135.

In another example, the measuring unit 125 detects that
the display of the mobile device 100 is in the "Off" state,
no user application is running on the mobile device 100,
the charge state of the battery is below a predefined level,
the mobile device 100 is connected to a power supply, and
the mobile device 100 is connected to the Internet via the mobile network flow 135 and the Wi-Fi network flow 140.

The algorithm decides that both communication interfaces 145, 150 can be kept activated because there is no risk the mobile device 100 runs out of battery power.

All measures that lead to a reduction in energy consumption can be combined by the algorithm with respect to an individual situation, in order to guarantee the best possible compromise between low energy consumption and multi-connectivity performance of the mobile device 100.

Figure 3:
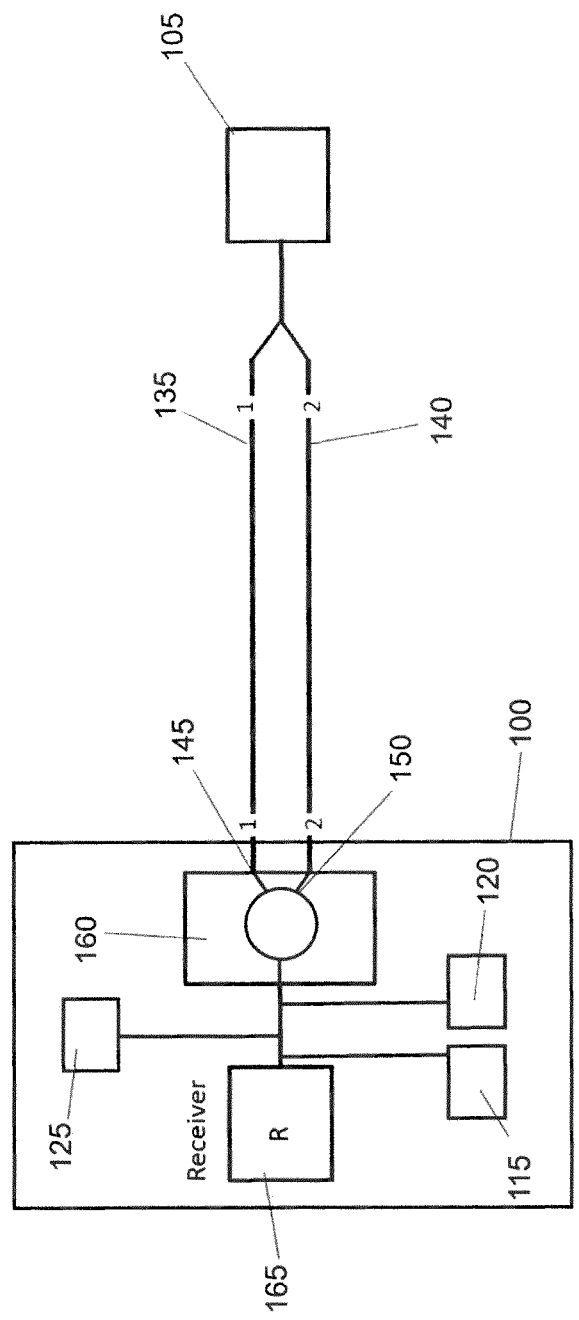
FIG. 3 shows the mobile device of FIG. 1 receiving packets of data.

In addition to the functionality of "actively" sending data to the network entity 105 as shown in FIG. 1, the mobile device 100 is also configured to receive data from the network entity 105 as shown in FIG. 3. in that case, the data is sent from the network entity 105 via the different network flows 135, 140 and enters the mobile device 100 via the communication interfaces 145, 150. The data is sent via the different network flows 135, 140 via individual data packages with the effect that the original order of the data packages can get scrambled—in other words, it can happen that the second package arrives before the first package at the mobile device 100. To mitigate that effect, the data packages are processed by a Re-Ordering unit 160 which puts the data packages in the original "temporal" order. The ordered data packages are processed by a receiver 165 of the mobile device 110 and can be used on applications running on the processor 115.

FIG. 3 shows a mobile device 100 that is connected to a network entity 105 via the internet. The mobile device 100 comprises a generator 110 that is configured to generate data traffic, a processor 115 configured to perform calculations and to execute algorithms, and a memory unit 120 to which the processor 115 has access and which is configured to store a condition listing that lists measured condition values of the mobile device 100.

In case that the mobile device 100 receives data packages from the network entity 105, the mobile device 100 reduces its energy consumption also in a way as described above in the context of FIG. 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for reducing the energy consumption of a mobile device having multi-connectivity functionality that comprises at least two different communication interfaces, wherein each of the least at least two different communication interfaces is associated to a different network flow, the method comprising:
generating an energy saving program, wherein the generated energy saving program is tailored to specific requirements of the mobile device at a specific point in time;
obtaining measured condition values of the mobile device;
comparing the measured condition values of the mobile device to entries of a condition listing, wherein the condition listing is stored in a memory of the mobile device; and initiating the energy saving program of the mobile device upon detecting a match of a measured condition value and an entry of the condition listing, wherein the energy saving program comprises the mobile device switching off the multi-connectivity functionality of the mobile device;

wherein the entries of the condition listing comprise condition values corresponding to at least one of the following: a display state, an activity state, a traffic consumption value, a traffic stream value, a service set ID (SSID) state, a basic service set ID (BSSID) state, an extended service set ID (ESSID) state, location information, or access type information; and wherein, based on the obtained measured condition values, the mobile device detects:

whether a display of the mobile device is off;

whether a charge state of a battery of the mobile device is below a predefined level;

whether any user application is running on the mobile device;

whether the mobile device is connected to a power supply; and whether the mobile device is connected to the Internet via a mobile network flow and via a Wi-Fi network flow.

2. The method of claim 1, further comprising:

measuring energy consumption of a plurality of network flows; and choosing, for data transfer while the multi-connectivity functionality of the mobile device is switched off, a network flow that has the lowest energy consumption out of network flows which fulfill a minimum bandwidth requirement of an application running on the mobile device.

3. The method of claim 1, further comprising:

measuring performance of a plurality of network flows; and choosing, for data transfer while the multi-connectivity functionality of the mobile device is switched off, a network flow that has the best performance out of the plurality of network flows for data transfer.

4. The method of claim 1, wherein the energy saving program is dynamically generated based on performance target parameters provided by an application running on the mobile device.

5. The method of claim 1, wherein generating the energy saving program takes a usage history of the mobile device into account;

wherein the energy saving program includes activation times based on information regarding times during which a user does not use the mobile device actively.

6. The method of claim 1, wherein the energy saving program further comprises: reducing a particular network interface and/or disabling multi-connectivity status messages.

7. The method of claim 1, wherein the energy saving program further comprises: reducing a particular network interface and disabling multi-connectivity status messages.

8. The method of claim 1, wherein generating the energy saving program comprises: selecting an energy saving measure out of the following energy saving measures: disabling or reducing a particular network interface, disabling an activation of a particular network interface, or disabling multi-connectivity status messages;

wherein the selected energy saving measure has the best performance out of energy saving measures which meet energy saving and/or performance target parameters corresponding to the energy saving program.

9. The method according to claim 1, wherein a condition value corresponding to the display state differentiates between whether a display of the mobile device is on or off; and wherein the mobile device switches off the multi-connectivity functionality based on the display being off.

10. The method according to claim 1, wherein a condition value corresponding to the activity state differentiates between whether a low power mode of the mobile device is activated; and wherein the mobile device switches off the multi-connectivity functionality based on the low power mode being activated.

11. The method according to claim 1, wherein the mobile device switches off the multi-connectivity functionality based on the traffic consumption value being below a predefined threshold.

12. The method according to claim 1, wherein the energy saving program further comprises the mobile device reducing certain frequencies, bandwidth and/or rates for a respective communication interface.

13. The method according to claim 1, wherein a condition value corresponding to the location information indicates whether the mobile device is located in a remote region; and wherein the mobile device switches off the multi-connectivity functionality based on the mobile device being in the remote region and being without energy supply.

14. The method of claim 1, further comprising:

detecting that the mobile device is connected to an electrical power supply; and in response to detecting that the mobile device is connected to an electrical power supply, terminating the energy saving program.

15. The method of claim 1, further comprising:

receiving user input regarding a degree to which performance of the mobile device should be lowered; and generating the energy saving program based on the user input regarding the degree to which performance of the mobile device should be lowered.

16. The method of claim 1, further comprising:

receiving user input regarding how long the battery charge of the mobile device should last; and generating the energy saving program based on the user input regarding how long the battery charge of the mobile device should last.

17. The method of claim 1, wherein the multi-connectivity functionality of the mobile device comprises operating Wi-Fi and cellular interfaces of the mobile device simultaneously for capacity aggregation, and wherein switching off the multi-connectivity functionality of the mobile device comprises disabling the Wi-Fi interface of the mobile device or disabling the cellular interface of the mobile device.

18. A mobile device having multi-connectivity functionality, comprising:

a memory having processor-executable instructions stored thereon; and a processor configured to execute the processor-executable instructions to facilitate the following being performed by the mobile device:

generating an energy saving program, wherein the generated energy saving program is tailored to specific requirements of the mobile device at a specific point in time;

obtaining measured condition values of the mobile device;

comparing the measured condition values of the mobile device to entries of a condition listing, wherein the condition listing is stored in the memory of the mobile device; and initiating the energy saving program of the mobile device upon detecting a match of a measured condition value and an entry of the condition listing, wherein the energy saving program comprises the mobile device switching off the multi-connectivity functionality of the mobile device;

wherein the entries of the condition listing comprise condition values corresponding to at least one of the following: a display state, an activity state, a traffic consumption value, a traffic stream value, a service set ID (SSID) state, a basic service set ID (BSSID) state, an extended service set ID (ESSID) state, location information, or access type information; and wherein, based on the obtained measured condition values, the mobile device is configured to detect:
   whether a display of the mobile device is off;
   whether a charge state of a battery of the mobile device is below a predefined level;
   whether any user application is running on the mobile device;
   whether the mobile device is connected to a power supply; and
   whether the mobile device is connected to the Internet via a mobile network flow and via a Wi-Fi network flow.

19. The mobile device of claim 18, wherein the processor is further configured to execute the processor-executable instructions to facilitate the following being performed by the mobile device:
   measuring a charge state of a battery of the mobile device.

20. A non-transitory computer-readable medium having processor-executable instructions stored thereon for reducing the energy consumption of a mobile device having multi-connectivity functionality that comprises at least two different communication interfaces, wherein each of the least at least two different communication interfaces is associated to a different network flow, and wherein the processor-executable instructions, when executed, facilitate performance of the following:

generating an energy saving program, wherein the generated energy saving program is tailored to specific requirements of the mobile device at a specific point in time;

obtaining measured condition values of the mobile device;

comparing the measured condition values of the mobile device to entries of a condition listing, wherein the condition listing is stored in a memory of the mobile device; and initiating the energy saving program of the mobile device upon detecting a match of a measured condition value and an entry of the condition listing, wherein the energy saving program comprises the mobile device switching off the multi-connectivity functionality of the mobile device;

wherein the entries of the condition listing comprise condition values corresponding to at least one of the following: a display state, an activity state, a traffic consumption value, a traffic stream value, a service set ID (SSID) state, a basic service set ID (BSSID) state, an extended service set ID (ESSID) state, location information, or access type information; and wherein, based on the obtained measured condition values, the mobile device is configured to detect:
   whether a display of the mobile device is off;
   whether a charge state of a battery of the mobile device is below a predefined level;
   whether any user application is running on the mobile device;
   whether the mobile device is connected to a power supply; and
   whether the mobile device is connected to the Internet via a mobile network flow and via a Wi-Fi network flow.

* * * * *